United States Patent
Blumenau (10) Patent No.: US 6,529,952 B1
(45) Date of Patent: *Mar. 4, 2003

(54) METHOD AND SYSTEM FOR THE COLLECTION OF COOKIES AND OTHER INFORMATION FROM A PANEL

(75) Inventor: Trevor Blumenau, San Francisco, CA (US)

(73) Assignee: Nielsen Media Research, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,539

(22) Filed: Apr. 2, 1999

(51) Int. Cl.[7] ............................................. G06F 15/173
(52) U.S. Cl. ....................... 709/223; 709/203; 709/229; 709/245; 713/201
(58) Field of Search ................................. 709/224, 225, 709/200, 203, 217, 218, 219, 245, 229, 204, 202, 223; 707/104.1; 713/201

(56) References Cited

U.S. PATENT DOCUMENTS

| | | | | |
|---|---|---|---|---|
| 5,675,510 A | * | 10/1997 | Coffey et al. | 709/224 |
| 5,724,091 A | * | 3/1998 | Freeman et al. | 348/13 |
| 5,796,952 A | | 8/1998 | Davis et al. | 709/224 |
| 6,055,573 A | * | 4/2000 | Gardenswartz et al. | 709/224 |
| 6,085,224 A | * | 7/2000 | Wagner | 709/203 |
| 6,144,988 A | * | 11/2000 | Kappel | 709/202 |
| 6,181,334 B1 | * | 1/2001 | Freeman et al. | 345/327 |
| 6,182,142 B1 | * | 1/2001 | Win et al. | 709/229 |
| 6,212,546 B1 | * | 4/2001 | Starkovich et al. | 709/203 |
| 6,253,325 B1 | * | 6/2001 | Steele et al. | 713/201 |
| 6,297,819 B1 | * | 10/2001 | Furst | 345/329 |
| 6,298,330 B1 | * | 10/2001 | Gardenswartz et al. | 709/224 |
| 6,317,777 B1 | * | 11/2001 | Skarbo et al. | 709/204 |
| 6,317,782 B1 | * | 11/2001 | Himmel et al. | 709/218 |
| 6,317,787 B1 | * | 11/2001 | Boyd et al. | 709/224 |
| 6,338,066 B1 | * | 1/2002 | Martin et al. | 707/10 |

* cited by examiner

Primary Examiner—Wellington Chin
Assistant Examiner—Chuong Ho
(74) Attorney, Agent, or Firm—Katten Muchin Zavis Rosenman (57) ABSTRACT

A panel arrangement is provided to collect access information relating to access by a plurality of panel members of a plurality of web sites. Each of the panel members accesses a corresponding web page stored at a central facility. The web page contains a URL for each of the web sites and an ID uniquely identifying the corresponding panel member. Each panel member transmits, either to each of the web sites corresponding to the URLs of the web page or to the central facility, the ID of the corresponding panel member and any panel member cookies which are stored by the panel member and which correspond to each of at least some of the URLs. Each of the web sites transmits, to the central facility, web site only that access information which relates to the panel members.

25 Claims, 8 Drawing Sheets

METHOD AND SYSTEM FOR THE COLLECTION OF COOKIES AND OTHER INFORMATION FROM A PANEL

RELATED APPLICATIONS

The present invention and the invention disclosed in U.S. patent application Ser. No. (28049/35288) are related.

TECHNICAL FIELD OF THE INVENTION

The present invention relates to the collection of cookies and other information from a panel.

BACKGROUND OF THE INVENTION

The Internet has proven to be an efficient and popular mechanism for the dissemination of information from web sites to clients. Web sites in many cases are operated by organizations, such as businesses, governmental agencies, educational institutions, and the like. Clients are often consumers who use computers usually located in their dwellings to access the content provided by web sites. Clients are also businesses, governmental agencies, educational institutions, and the like.

The operator of a web site has an interest in the number of clients that use its web site as well as the demographics of those clients. For example, such information is useful in giving an advertiser some assurance that its advertisement will reach enough clients of the type who are typically interested in the product or service offered by the advertiser to warrant placing the advertisement with the web site. Also, such information is instructive to the web site operator in creating web pages for a particular target audience.

In accordance with the present invention, cookies and access information can provide useful information about the usage of a web site by its clients. Cookies are typically downloaded from web sites to the clients that visit them. A web browser executing on a client's computer sets aside a small amount of memory (usually 0 to 4 kilobytes) for each web site server visited by the client. Accordingly, when the client receives a cookie from a web site, the client's web browser stores the cookie in the memory set aside for that web site. The contents of the memory, and the length of time it is maintained, are specified by the web site.

A cookie is used by web sites to distinguish web browsers/clients from one another. In other words, a cookie allows a web site to determine whether a client request is received from the same client that previously made some other request, or whether a client request has been received from a wholly different client than the client making the previous request. In short, cookies give web browser client applications uniqueness. This uniqueness is important to a web site's ability to keep track of the state of each of many client requests. Therefore, cookies permit a web site to distinguish one client from another, to distinguish sessions of use by a single client, and to keep track of many other important aspects of the display of content on a client's computer.

Cookies are added to the headers of the HTTP transfer protocol. Essentially, when a client makes a request of a web site, the web site may issue a storage directive in the header of its response to the client's is request. Such a directive may look like the following:

Set-Cookie: CUSTOMER=WILE_E_COYOTE; expires=Wednesday, Nov. 9, 1999 23:12:40 GMT.

In the above example, "CUSTOMER=WILE_E_COYOTE" is stored by the browser operating on the client's computer until Nov. 9, 1999. However, a web site need not specify any expiration date for the cookie, in which case the cookie expires when the client's browser is exited.

Whenever the client makes a subsequent request to the same web site, the client's browser will include in the header of such a request the following string, from the date that the cookie is originally set until the cookie expires:

Cookie: CUSTOMER=WILE_E_COYOTE.

A web site can overwrite a cookie that it sets at a client's computer. Also, a web site can store multiple cookies on a client's computer. In this case, a client's browser will place the following general statement in the request header when the client makes a request:

Cookie: NAME1=STRING1; NAME2=STRING2; . . .

The general syntax used by a server in setting a cookie is as follows:

Set-Cookie
  name=value
  [;EXPIRES=dateValue]
  [;DOMAIN=domainName]
  [;PATH=pathName]
  [;SECURE]

The use of the EXPIRES clause in the above syntax is described above. The DOMAIN clause is optional and is used to specify a set of machines in a DOMAIN that should have access to the cookie content. If a web site does not specify a DOMAIN name for this clause, the DOMAIN clause defaults to the name of the web site that issued the Set-Cookie directive so that only this web site has access to the corresponding cookie. In other words, only a cookie, which matches the DOMAIN specified by a particular web site that set the cookie, will be sent by the client to that web site in the header of an HTTP request. Accordingly, this DOMAIN clause is the fundamental basis for the security of cookies because one web site has no access to the cookies of another web site.

The PATH clause is optional and is seldom used. The PATH clause forces a further limitation on when cookie information is sent from the client to the web site. Only requests that lie within the PATH of the specified DOMAIN contain the cookie in the request's HTTP header.

The SECURE clause is also optional and, if set, insures that the cookie is transmitted over a SECURE socket session. If the SECURE clause is not set, it is assumed that the cookie data is accessible to any document or CGI program that meets the other DOMAIN and PATH matching properties.

Many web sites currently use cookies to track their clients' visits to their servers and to distinguish requests from one client to another. This tracking is easily achieved, for example, by setting a unique cookie (such as a counted sequence or a date/time stamp) for each new client visiting a site. Repeat clients are not re-tagged within the expiration period of previously set cookies.

Accordingly, a web site can accumulate information regarding the clients who visit them. However, it is difficult for a web site to accumulate information about others who could have an interest in its content offerings but who, for one reason or another, do not access its server. It is also difficult for a web site to accumulate demographic information about the clients who visit them. Such demographic information is not available from the log files maintained by a web site. What is needed, therefore, is a statistically selected panel of clients that represents the entire population of those who have an interest in the types of content offered by a web site.

In assembling a panel, candidates for the panel are selected randomly by a market research company. Ideally, every candidate selected for the panel would agree to serve on the panel. However, candidates fail to participate for a variety of reasons. For example, candidates may refuse to accept any unsolicited contacts, or candidates may refuse to participate once they hear the reason for the panel, or candidates may refuse to answer any questions of a demographic nature, or candidates may refuse to load metering software fearing that such software may alter the operation of their computers, or candidates may agree to serve on the panel but never actually report data back to the market research company.

Accordingly, the cooperation rate of candidates is generally less than 100%. (The cooperation rate is defined as the number of people who actually report data divided by the number of people originally contacted for participation, multiplied by 100.) This cooperation rate is important because the randomness of the membership of the panel depends on the cooperation rate. That is, if the cooperation rate in assembling the panel is too low, the membership of the panel is less random, which introduces a bias into the data reported by the panel. Thus, the closer the cooperation rate is to 100%, the closer the panel membership approaches true randomness and the less bias is introduced into the reported data.

When the panel is to be a business panel, additional factors may lower the cooperation rate even more. For example, businesses are often reluctant to reveal company information outside the company, businesses frequently view data collecting software as a security risk, and the authorization procedures of businesses may discourage the installation of such software.

All of these factors make it difficult to assemble a panel which has a truly random membership. Therefore, there is a need for an arrangement which permits the creation of a panel having a high cooperation rate. The present invention is directed to such an arrangement.

SUMMARY OF THE INVENTION

In accordance with one aspect of the present invention, a system comprises panel members, web sites, and a central facility interconnected in a network. The central facility is arranged to collect cookie information and access information regarding usage of the web sites by the panel members.

In accordance with another aspect of the present invention, a method of collecting access information relating to access by panel members to a plurality of web sites comprises the following steps: a) accessing, by each of the panel members, a web page stored at a central facility, wherein the web page contains a URL for each of the web sites; b) in response to step a), transmitting, from each panel member either to each of the web sites corresponding to the URLs of the web page or to the central facility, any panel member cookies which the panel member has stored and which correspond to the URLs; c) accumulating at each of the web sites access information relating to the panel members; and, d) transmitting, from each of the web sites to the central facility, the accumulated access information.

In accordance with yet another aspect of the present invention, a system comprises panel members, web sites, and a central facility interconnected in a network. Each of the web sites stores a central facility sub-server. The central facility is arranged to initiate the transmission of panel member cookies from the panel members to the web sites, and each of the central facility sub-servers is arranged to detect client cookies contained in incoming messages, to compare the panel member cookies to the client cookies, and to transmit to the central facility access information corresponding to the panel member cookies that match the client cookies.

In accordance with still another aspect of the present invention, a system comprises panel members, web sites, and a central facility interconnected in a network. The central facility stores a central facility sub-server for each of the web sites, and the central facility is arranged to initiate the transmission of panel member cookies from the panel members to the central facility. Each of the web sites is arranged to download panel member cookies from the central facility, to compare the panel member cookies to client cookies corresponding to log entries, and to transmit to the central facility access information from the log entries that correspond to the client cookies which match the panel member cookies.

In accordance with a further aspect of the present invention, a computer readable storage medium has program code stored thereon which, when executed at a web site, performs the following tasks: a) receiving panel member cookies from panel members, wherein the web site, the panel members, and a central facility are interconnected by a network; b) detecting client cookies from clients connected ho to the network, wherein the clients include the panel members; c) comparing the panel member cookies to the client cookies; and, d) transmitting to the central facility access information corresponding to the client cookies that match the panel member cookies.

In accordance with a yet further aspect of the present invention, a computer readable storage medium has program code stored thereon which, when executed at a web site, performs the following tasks: a) receiving panel member cookies from a central facility, wherein the web site, panel members, and the central facility are interconnected by a network; b) detecting client cookies from clients connected to the network, wherein the clients include the panel members; c) comparing the panel member cookies to the client cookies; and, d) transmitting to the central facility access information corresponding to the client cookies that match the panel member cookies.

BRIEF DESCRIPTION OF THE INVENTION

These and other features and advantages of the present invention will become more apparent from a detailed consideration of the invention when taken in conjunction with the drawings in which.

DETAILED DESCRIPTION

Figure 1:
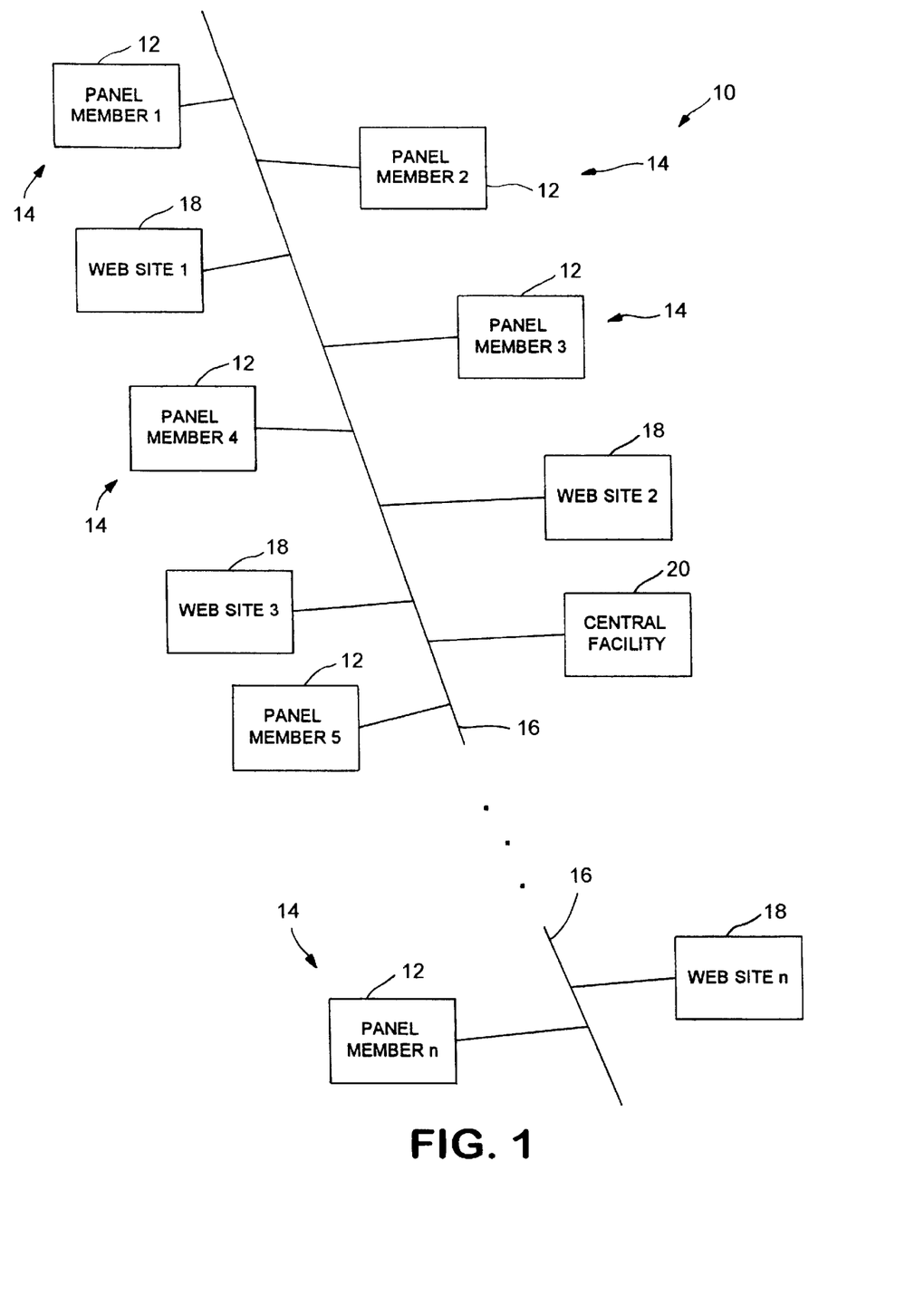
FIG. 1 illustrates a network in which the present invention may be practiced.

A web site usage metering system 10 is shown in FIG. 1. The web site usage metering system 10 includes a plurality of panel members 12, where each of the panel members 12 has a corresponding computer at a corresponding statistically selected site 14. The number and locations of these statistically selected sites 14 depend upon statistical sampling methods. However, a sufficient number of the statistically selected sites 14 should be selected in order to provide data which is representative of the population segments relevant to the web site usage information being collected from the panel members 12.

The computers of the panel members 12 are connected to a network 16 which may be, for example, the Internet. As is known, the Internet is typically accessed through the public telephone network. However, the network 16 may involve other arrangements such as local area networks, cable networks, satellite networks, and other networks through which content is electronically disseminated.

Web sites 18 are also connected to the network 16, and are arranged to provide content to their clients among which are the panel members 12 at the statistically selected sites 14. The web sites 18 are arranged in accordance with the present invention to log cookies and access information related to the clients that visit them, and to periodically transmit to a central facility 20 that part of the cookies and access information corresponding to a subset of these clients, i.e., the panel members 12. Access information, for example, can include which web pages were accessed by the panel members 12, dates and times of data transfer requests, request types, URLs, result codes, the number of data bytes transferred, the time required to complete a data transfer, preference items, and/or other relevant information. Moreover, for purposes of the present invention, cookies may mean entire cookies or desired portions thereof.

The panel members 12 may be businesses, for example, who have been recruited to form a panel in order to provide data which the central facility 20 can report as being representative of the entire business segment to which the panel members 12 belong. For this purpose, it is important that the panel members 12 statistically represent this business segment. It should be understood, however, that the panel members 12 may be selected from any segment of the population of interest, such as consumers. In any case, the central facility 20, which is also connected to the network 16, orchestrates the collection of cookie information from the panel members 12 and access information from the web sites 18.

For the purpose of collecting cookie information, a central facility sub-server can be physically added to the server pool of each of the web sites 18. Then, by including suitable references to material on each of the web sites 18 in a web page resident on the server of the central facility 20, the panel members 12 can be induced to issue HTTP requests to each of the central facility sub-servers distributed among the web sites 18 being metered. Accordingly, this web page is assembled with references to the central facility sub-servers resident on the servers of the web sites 18. Each such reference is a fully qualified URL. The following is an example of such a Web page:

```
<html>
<head><title>Welcome Panel Member</title></head>
<body>
Please wait for this page to full load.
    <iframe width=468 height=60 src="http://sub-
        server.domain1.com/panelmemberID=12345">
    <iframe width=468 height=60 src="http://sub-
        server.domain2.com/panelmemberID=12345">
    <iframe width=468 height=60 src="http://sub-
        server.domain3.com/panelmemberID=12345">
    <iframe width=468 height=60 src="http://sub-
        server.domain4.com/panelmemberID=12345">
    <iframe width=468 height=60 src="http://sub-
        server.domain5.com/panelmemberID=12345">
    <iframe width=468 height=60 src="http://sub-
        server.domain6.com/panelmemberID=12345">
</body>
</html>
```

It is noted that the above web page includes references to six central facility sub-servers, where each central facility sub-server is located at a corresponding one of six of the web sites 18. However, this web page may contain more or fewer references to sub-servers depending upon the number of the web sites 18 to be metered. It is also noted that the above web page should be dynamically generated for each of the panel members 12, so that each ID uniquely identifying a corresponding one of the panel members 12 is included in the web page when that panel member accesses this web page. With this arrangement, the IDs of the panel members 12 are paired with cookies and are included in any requests that the panel members 12 make to the web sites 18. In this way, the central facility sub-server at each of the web sites 18 can "sniff" the HTTP requests arriving at the web sites 18 for the arriving cookies associated with that web site. Also, the central facility 20 stores demographic information relating to the panel members 12 corresponding to their IDs.

Figure 2:
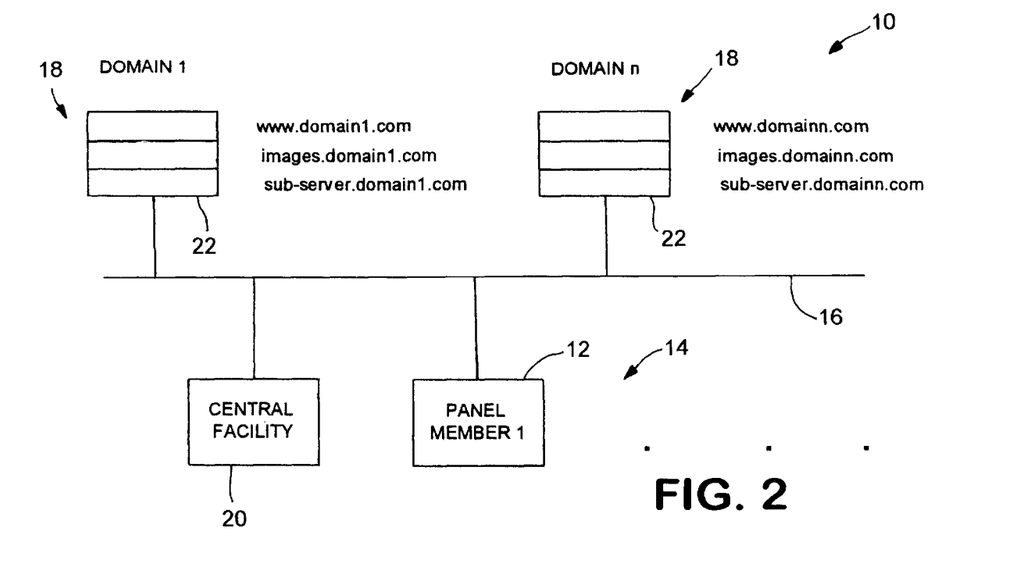
FIG. 2 illustrates a first embodiment of the present invention.

By placing central facility sub-servers at each of the web sites 18 being metered, the system architecture has the appearance shown in FIG. 2. In FIG. 2, each of the web sites 18 being metered is shown as a corresponding domain, and each domain has one or more servers including a central facility sub-server 22 denoted as sub-server.domainn. It is noted that only two of the web sites 18, DOMAIN1 and DOMAINn, are represented in the system architecture shown in FIG. 2. However, this system architecture will include as many of the web sites 18 as are being metered by the central facility 20 with the use of the panel members 12.

Figure 3:
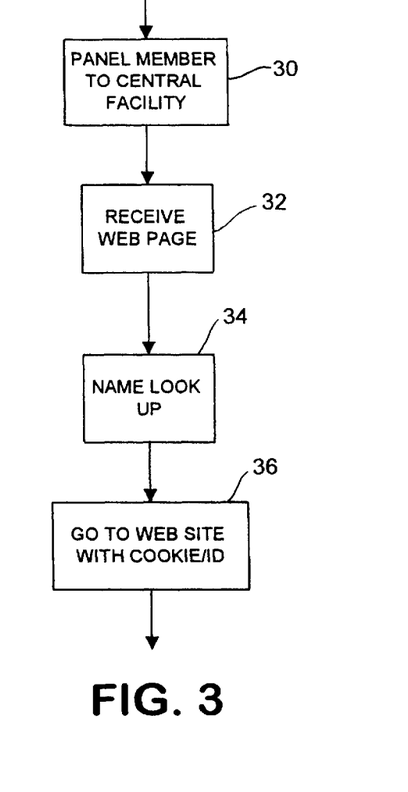
FIG. 3 illustrates functions executed by a computer of a panel member in accordance with the first embodiment of the present invention.
Figure 4:
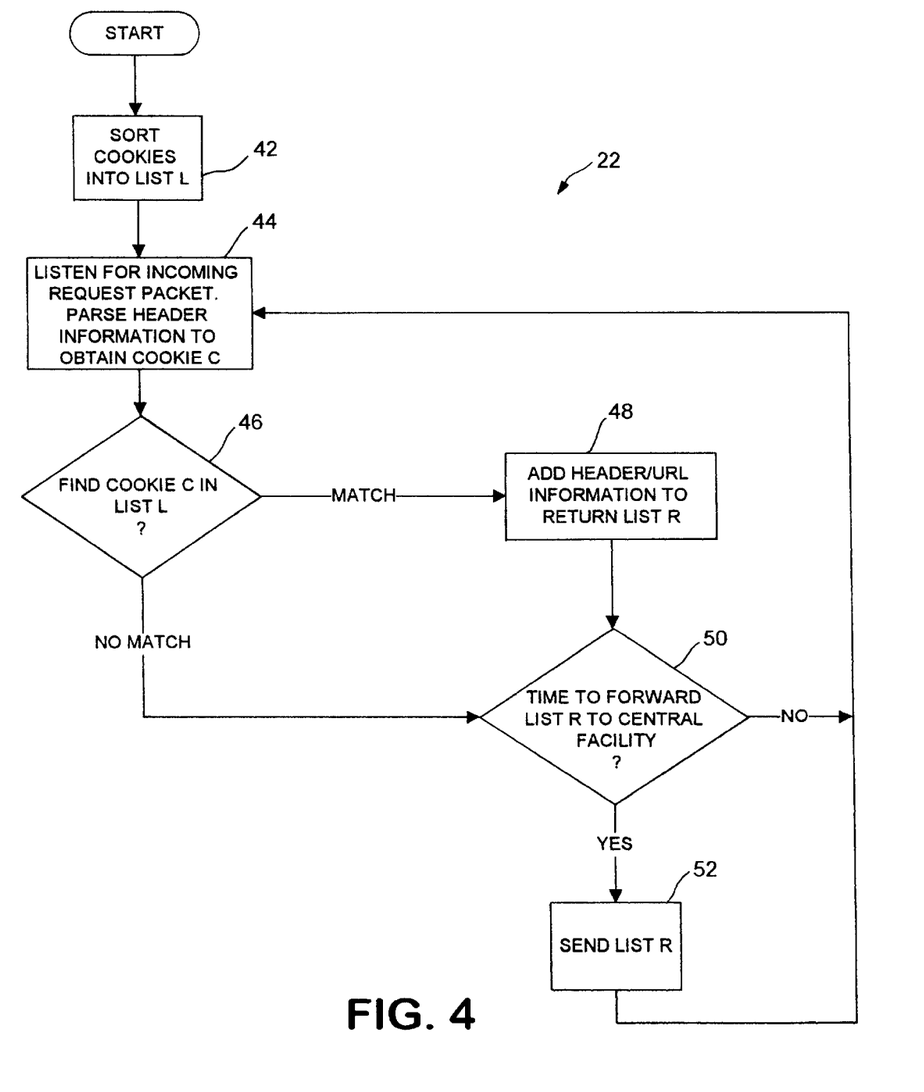
FIG. 4 illustrates a flow chart of a program that may be executed by a central facility sub-server running on a computer of a web site in accordance with the first embodiment of the present invention.
Figure 5:
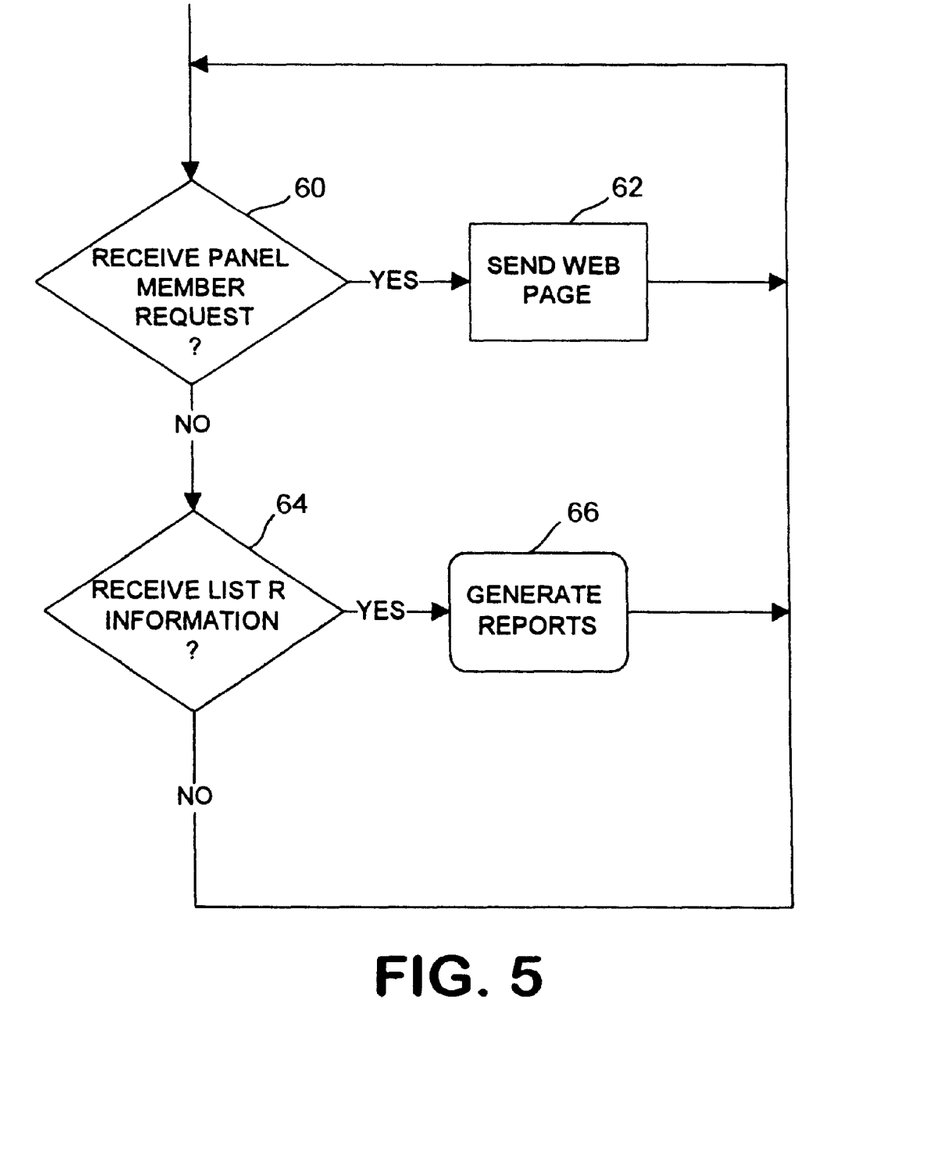
FIG. 5 illustrates functions executed by a server of a central facility in accordance with the first embodiment of the present invention.

The collection of cookie and access information related to the system architecture shown in FIG. 2 is implemented according to the flow charts illustrated in FIGS. 3, 4 and 5. The flow chart shown in FIG. 3 represents functions performed by the computer of each of the panel members 12 who volunteers to serve in the panel according to the present invention. The flow chart shown in FIG. 4 represents functions performed by each of the central facility sub-servers 22 loaded on the servers of the web sites 18. The flow chart shown in FIG. 5 represents functions performed by the server (i.e., computer) at the central facility 20.

As shown in FIG. 3, a panel member at a block 30 accesses the web page which is described above and which is maintained at the central facility 20. This access, for example, may be periodic, such as once a month, or this access may be a one time access. As a result of this access, the web page maintained at the central facility 20 is downloaded by the central facility 20 and is received by the accessing panel member at a block 32.

At a block 34, the panel member 12 looks up the name at the appropriate web site 18 corresponding to a first of the URLs contained in the downloaded web page. This name look-up verifies the central facility sub-server identified in the URL, permitting the panel member 12 at a block 36 to send the cookie corresponding to the web site 18 identified in the URL, if that cookie exists in the memory of the computer of that panel member 12. If the panel member 12 transmits a cookie to that web site 18, the panel member 12 at the block 36 also transmits its ID contained in the downloaded web page with the cookie. The functions of the blocks 34 and 36 are then repeated for each of the other URLs contained in the downloaded web page.

Thus, if web site 1 of the web sites 18 had previously stored cookie "A" on the computer of panel member 1, and if the downloaded web page contains a URL for the central facility sub-server running at web site 1, then panel member 1 at the block 36 sends cookie "A" and the panel member's ID to web site 1. Also, if web site 2 of the web sites 18 had previously stored cookie "B" on the computer of panel member 1, and if the downloaded web page contains a URL for the central facility sub-server running at web site 2, then panel member 1 at the block 36 sends cookie "B" and the panel member's ID to web site 2, and so.

The function represented by the block 30 is a manual operation performed by the panel member 12 at the behest of the central facility 20. Thus, the panel member 12 at the block 30 enters an HTTP request with the URL of the central facility 20 into the panel member's computer and sends the HTTP request over the network 16. The functions performed at the blocks 32–36 are normal operations of a browser. Accordingly, the present invention requires little or no intrusion into the panel members 12.

As shown in FIG. 4, each of the central facility sub-servers 22 performs the functions indicated by blocks 42–52. Accordingly, at a block 42, each of the central facility sub-servers 22 sorts (such as alphabetically/numerically) the cookie/ID pairs transmitted to it by the panel members 12 at the block 36 into a list L. At the block 44, each of the central facility sub-servers 22 (i) detects each incoming request packet received by the corresponding web site 18, and (ii) parses the header of the incoming request packet in order to obtain the cookie C contained therein. At the block 46, a determination is made as to whether the cookie C is on the list L.

If the cookie C is on the list L, the header/URL information contained in the incoming message is added to a return list R. Other information related to the request detected at the block 44, such as the web page accessed by the request, the date and time of the request, the request type, the result code, the number of data bytes transferred as a result of the request, the time required to complete a data transfer in response to the request, preference items, and/or other relevant information may also be added to the return list R at the block 48. Thus, the return list R includes the access information described above.

After the appropriate information is added to the return list R at the block 48, or the cookie C is not found on the list L at the block 46, the central facility sub-server 22 at a block 50 determines whether it is time to transmit the return list R to the central facility 20. If it is not time to make this transmission, program flow returns to the block 44 in order to detect the next incoming request packet. However, if it is time to make this transmission, the central facility sub-server 22 at the block 52 transmits the return list R to the central facility 20.

The return list R transmission times as determined at the block 50 may be periodic, non-periodic, or the like. For example, the central facility sub-servers 22 may determine at the block 50 to periodically transmit this data to the central facility 20 on a daily, weekly, monthly, or other basis. Alternatively, the central facility sub-servers 22 may determine at the block 50 to transmit the return list R instantly upon logging the appropriate data at the block 48. Thus, the header/URL and other relevant access information collected by the various central facility sub-servers 22 can be forwarded immediately to the central facility 20 or these data transfers can be made periodically en masse.

As shown in FIG. 5, if the central facility 20 at a block 60 receives a request from one of the panel members 12 to access the web page maintained at the central facility 20, the central facility 20 at a block 62 inserts that panel member's ID with the URLs contained in that web page and transmits the web page to the requesting panel member. If the central facility 20 at a block 64 receives the return list R transmitted by each of the central facility sub-servers 22 at the block 52, the central facility 20 at a block 66 stores the information contained in the received return lists R and generates appropriate reports when a sufficient number of return lists R has been received. These reports, for example, can cover the population segment (such as an appropriate business segment) to which the panel members 12 belong.

Figure 6:
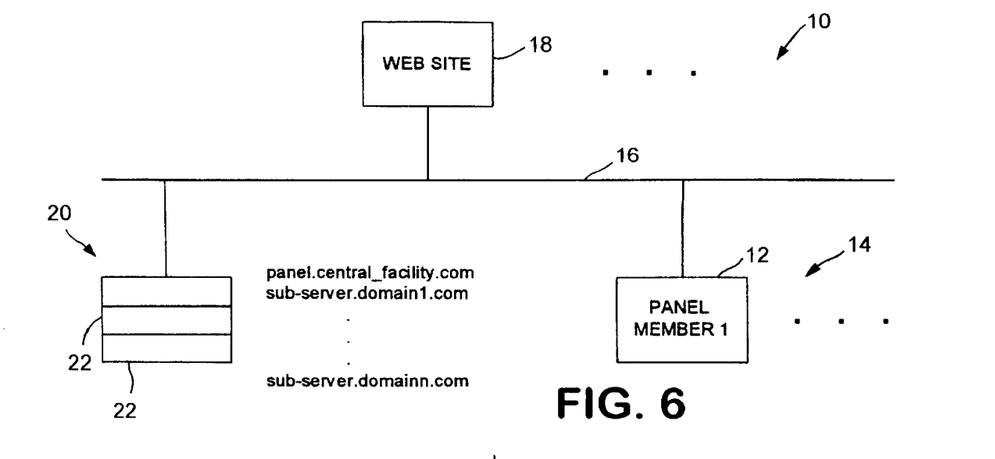
FIG. 6 illustrates a second embodiment of the present invention.

It is not mandatory that the central facility sub-servers 22 reside on the servers of the web sites 18. For example, the central facility sub-servers 22 could be physically located behind appropriate firewalls on the server of the central facility 20, as shown in FIG. 6. In this arrangement, the names of the central facility sub-servers 22 are added to the entry tables of the Domain Name Systems of the web sites 18. Accordingly, the Domain Name System of each of the web sites 18 establishes pairings between the names of the central facility sub-servers 22 (such as sub-server.domainn) and the IP address of the server at the central facility 20. Thus, so long as the Domain Name System tables of the web sites 18 point to the IP address of the server at the central facility 20, the panel members' cookie/ID pairs will be sent to the central facility 20.

Thus, the system architecture shown in FIG. 2 may be simplified because multiple names can be established for a single IP address in the Domain Name System. Accordingly, the system architecture for the web site usage metering system 10 can be simplified to that shown in FIG. 6. The central facility sub-servers 22 are stored on the server of the central facility 20. The pairings between the names of the central facility sub-servers 22 and the IP address of the server of the central facility 20 are stored in the Domain Name Systems of the web sites 18.

Figure 7:
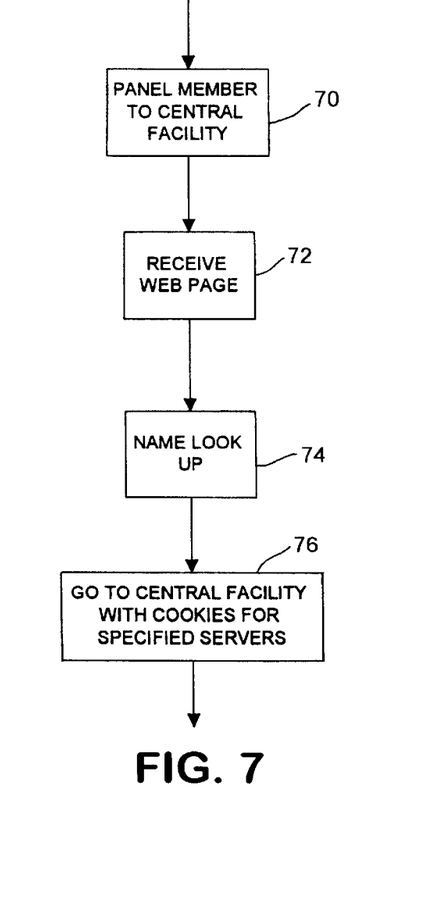
FIG. 7 illustrates functions executed by a computer of a panel member in accordance with the second embodiment of the present invention.

The panel members 12 in the system architecture shown in FIG. 6 operate in accordance with the flow chart shown in FIG. 7. As shown in FIG. 7, a panel member 12 at a block 70 accesses the web page which is described above and which is maintained at the central facility 20. As a result of this access, the web page maintained at the central facility 20 is downloaded by the central facility 20 5 and is received by the accessing panel member 12 at a block 72.

At a block 74, the panel member 12 looks up the name of the web site 18 corresponding to a first of the URLs contained in the downloaded web page. Because the Domain Name System of that web site 18 includes both the name of the central facility sub-server 22 contained in the first URL and the IP address of the server at the central facility 20, the web site 18 returns that IP address to the panel member 12. As a consequence of receiving this IP address, the panel member's browser at a block 76 sends the cookie corresponding to the web site 18 identified in the URL to the IP address of the central facility 20, if the cookie exists in the memory of the computer of that panel member 12. If the panel member 12 at the block 76 transmits a cookie to the central facility 20, the panel member 12 at the block 76 may also transmit its ID contained in the downloaded web page with the cookie. The functions of the blocks 74 and 76 are then repeated for each of the other URLs contained in the downloaded web page.

As in the case of FIG. 3, the function performed by the panel member 12 at the block 70 is a manual operation performed by the panel member 12 at the behest of the central facility 20. Thus, the panel member 12 at the block 70 enters an HTTP request with the URL of the central facility 20 into the panel member's computer and sends the HTTP request over the network 16. The functions performed at the blocks 72–76 are the normal operations of a browser. Accordingly, the present invention again requires little or no intrusion into the panel members 12.

Figure 8:
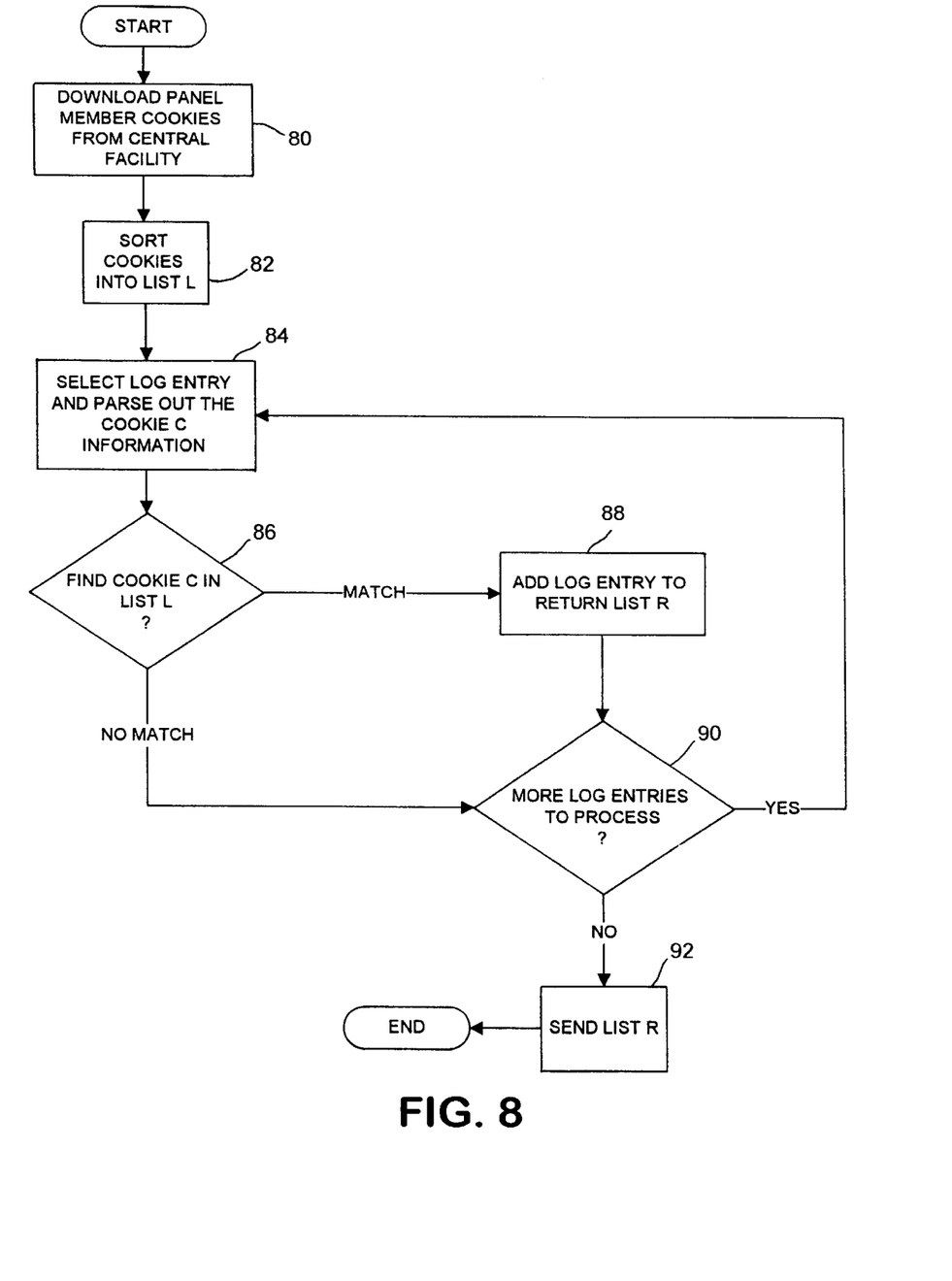
FIG. 8 illustrates a flow chart of a program that may be executed by a computer of a web site in accordance with the second embodiment of the present invention.

The flow chart of FIG. 8 represents a program which is executed by the computer at each of the web sites 18. When it is time to transmit appropriate information to the central facility 20, the web sites at a block 80 download from the central facility 20 the panel member cookies which were transmitted to the central facility 20 by the panel members 12 at the block 76. The web sites 18 at a block 82 sorts (such as alphabetically/numerically) the received cookies into a list L. The web sites 18 at a block 84 (i) selects a log entry from the log that the servers at the web sites 18 routinely maintain and (ii) parses the log entry in order to obtain the cookie C contained therein. At the block 86, a determination is made as to whether the cookie C is on the list L.

If the cookie C is on the list L, the log entry (which contains header/URL information as well as other information such as the web pages requested by the corresponding panel member, the dates and times of each of the requests, each of the request types, each of the result codes, the number of data bytes transferred as a result of each of the requests, the times required to complete a data transfer in response to each of the requests, preference items, and/or other relevant information) selected at the block 84 is added to a return list R at a block 88.

After the appropriate access information is added to the return list R at the block 88, or if the cookie C is not found on the list L at the block 86, a determination is made at a block 90 as to whether there are more log entries to process. If there are more log entries to process, program flow returns to the block 84 in order to select another log entry. However, if there are no more log entries to process, the return list R is transmitted to the central facility 20 at a block 92.

Figure 9:
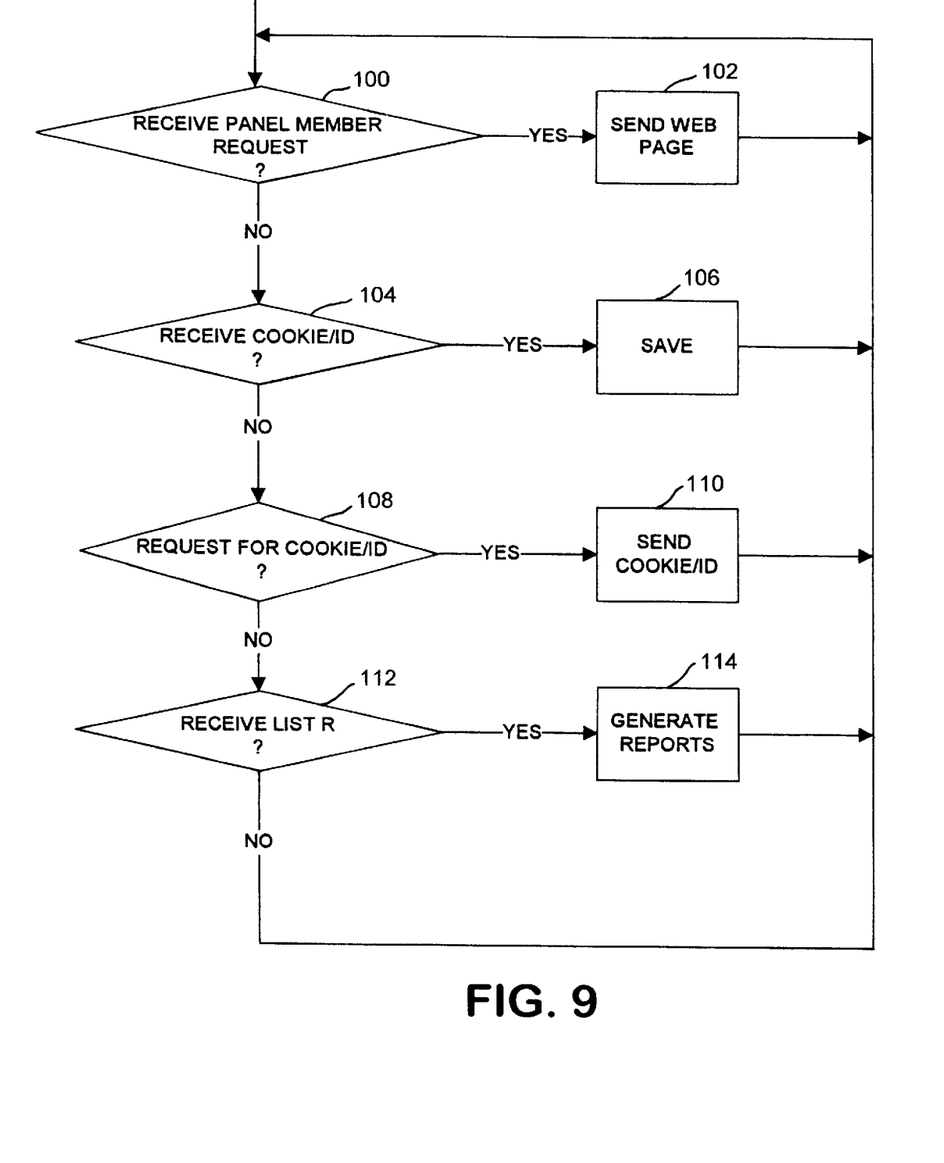
FIG. 9 illustrates functions executed by a server of a central facility in accordance with the second embodiment of the present invention; and, FIG. 10 illustrates a binary search that may be implemented during the execution of the programs of FIGS. 4 and 8.

The server at the central facility 20 operates in accordance with the flow chart shown in FIG. 9. Thus, if the central facility 20 receives a request at a block 100 from a panel member for the web page stored at the central facility 20, the central facility 20 at a block 102 inserts the ID for the requesting panel member into the web page and sends the web page to the requesting panel member.

If the central facility 20 at a block 104 receives cookie/ID pair(s) from one of the panel members 12 in response to the web page sent by the central facility 20 to the panel members 12 at the block 102, the central facility 20 saves the cookie/ID pair(s) at a block 106.

If the central facility 20 at a block 108 receives a request for cookie/ID pairs from one of the web sites 18 which has transmitted that request at the block 80, the central facility 20 at a block 110 transmits the requested cookie/ID pairs to the requesting web site.

If the central facility 20 at a block 112 receives the return lists R transmitted by the web sites 18 at the block 92, the central facility 20 at a block 114 stores the received return lists R and generates appropriate reports when a sufficient number of return lists R has been received. These reports, for example, can cover the population segment (such as an appropriate business segment) to which the panel members 12 belong.

Figure 10:
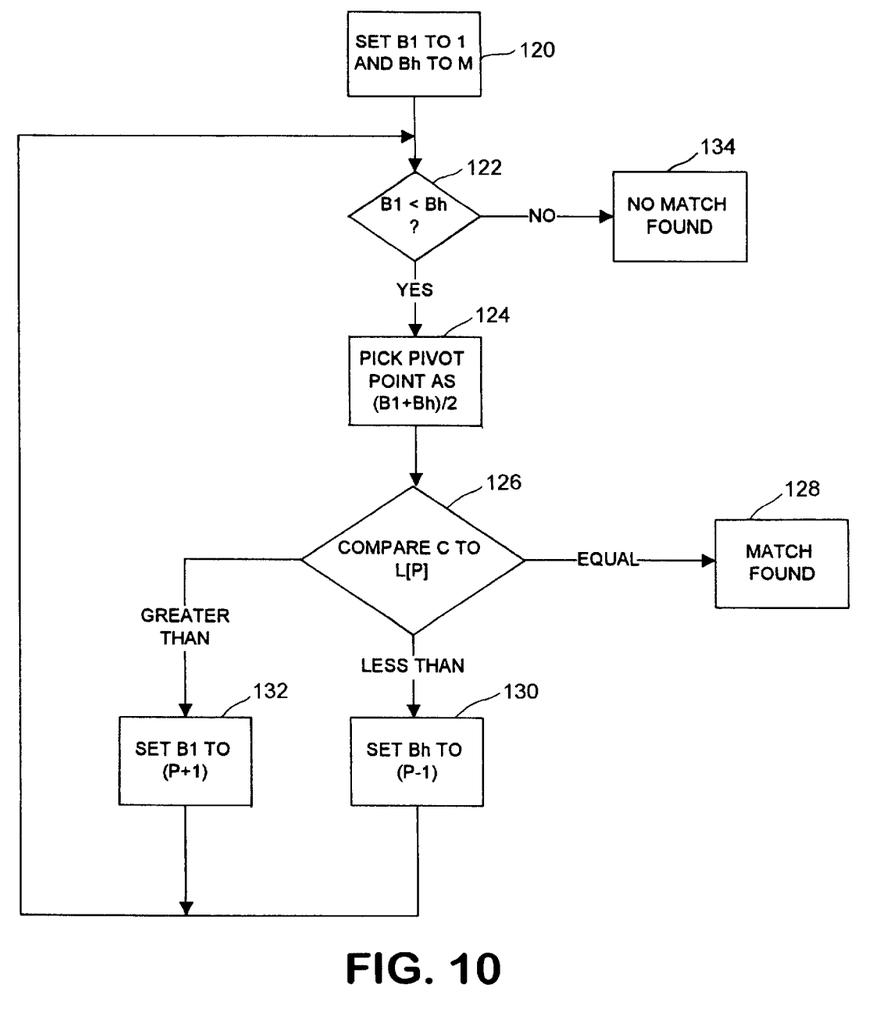

The blocks 46 and 86 can implement a binary search routine in order to detect the appropriate matches. Such a binary search routine is shown in FIG. 10. As a first step in the binary search, a variable B1 is set to one and a variable Bh is set to M at a block 120. The quantity M represents the number of cookies contained in the list L. (Alternatively, the variable B1 can be set to zero and the variable Bh can be set to M−1.) B1 is compared to Bh at a block 122. If B1 is less than Bh, a pivot point P is computed at a block 124 according to the following equation:

$$P = \frac{(Bl + Bh)}{2} \tag{1}$$

The pivot point P represents the position of a cookie in the list L. This cookie at the position P in the list L is compared at a block 126 to the cookie C from an incoming message or from a log entry, as the case may be. If the cookie at the pivot position P in the list L matches the cookie C, a match is found at a block 128.

If the cookie C is lower in the list L than the cookie at the pivot position P, then the variable Bh is set to a value of P−1 at a block 130. That is, one is subtracted from the pivot point P and the result becomes the new value of Bh. On the other hand, if the cookie C is higher in the list L than the cookie at the pivot position P, then the variable B1 is set to a value of P+1 at a block 132. After the variable Bh is set to a value of P−1 at the block 130, or after the variable Bi is set to a value of P+1 at the block 132, program flow returns to the block 122. If B1 is still less than Bh, a new pivot point P is computed at a block 124 based upon the new value for B1 or Bh. Accordingly, the list L is continually cut in half until a match is found at the block 128. If B1 is not less that Bh as determined at the block 122, then the entire list L has been searched for the cookie C and no match was found, as indicated by a block 134.

Certain modifications of the present invention have been discussed above. Other modifications will occur to those practicing in the art of the present invention. For example, a specific web page resident on the server of the central facility 20 has been described above by way of example. Alternatively, other web pages can be designed to carry out the present invention. For example, an HTML page employing JavaScript to control image or frame loading concurrent with demographic data collection could easily be provided.

Also, a binary search routine has been described above in order to determine matches between the cookies C and the cookies saved in the list L. Other search routines could instead be used. Also, the binary search routine described above could be modified to speed up the search. For example, the comparison performed at the block 126 could be a fuzzy logic comparison where more than three choices are provided. If seven choices are selected, these choices can include (i) much, much less than (<<<), (ii) much less than (<<), (iii) less than (<), (iv) equal to (=), (v) more than (>), (vi) much more than (>>), and (vii) much, much more than (>>>). A different pivot point P could then be calculated depending upon the comparison results.

Moreover, the panel members 12 are identified by inserting IDs into the web page by the central facility 20. This identification is particularly advantageous to the first embodiment of the present invention because it allows the central facility 20 to relate the information contained in the return list R to the individual panel members 12. However, it may not be as important in the second embodiment to identify the panel members 12 by inserting IDs into the web page of the central facility 20. For example, because the central facility 20 receives the cookies from the panel members 12 in response to access of the web page by the panel members 12, it can identify the panel members 12 from the return messages containing the panel member cookies and can accordingly store each set of received panel member cookies with the identity of the corresponding panel member 12. Then, when the central facility 20 receives the return list R, the central facility can relate each datum in the return list R with the identity of the corresponding panel member 12 through use of the cookies.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system comprising panel members, web sites, and a central facility interconnected in a network, wherein
    the central facility is arranged to collect cookie information and access information regarding usage of the web sites by the panel members, and wherein
    the collected cookie information and access information is stored by each web site and transmitted from each web site to the central facility, and wherein
    each web site stores a corresponding central facility sub-server, and wherein
    the central facility stores a web page, and wherein
    the web page contains a URL of each web site, and wherein
    each panel member is arranged to access the web page and to respond to the URLs of the web page by transmitting to the web sites any panel member cookies which the panel member has stored and which correspond to the URLs, and wherein
    the web sites are arranged to receive client cookies, to compare the client cookies to the panel member cookies, and to transmit to the central facility access information corresponding to the panel, member cookies that match the client cookies.

2. The system of claim 1, wherein the comparison of the client cookies to the panel member cookies involves a binary search.

3. A system comprising panel members, web sites, and a central facility interconnected in a network, wherein
    the central facility is arranged to collect cookie information and access information regarding usage of the web sites by the panel members, and wherein
    the collected cookie information and access information is stored by each web site and transmitted from each web site to the central facility, and wherein
    each web site stores a corresponding central facility sub-server, and wherein
    the panel members are arranged to transmit to the web sites any panel member cookies which the panel members have stored and which correspond to the web sites and wherein
    the web sites are arranged to receive client cookies, to compare the client cookies to the panel member cookies, and to transmit to the central facility access information corresponding the panel member cookies that match the client cookies.

4. The system of claim 3 wherein the comparison of the client cookies to the panel member cookies involves a binary search.

5. A system comprising panel members, web sites, and a central facility interconnected in a network, wherein
    the central facility is arranged to collect cookie information and access information regarding usage of the web sites by the panel members, and wherein
    the collected cookie information and access information is stored by each web site and transmitted from each web site to the central facility, and wherein
    each web site stores a corresponding central facility sub-server, and wherein
    the panel members are arranged to transmit to the web sites any panel member cookies which the panel members have stored and which correspond to the web sites and wherein
    the web sites are arranged to receive client cookies, to compare the client cookies to the panel member cookies, and to transmit to the central facility access information only about those client cookies matching the panel member cookies.

6. A system comprising panel members, web sites, and a central facility interconnected in a network, wherein
    the central facility is arranged to collect cookie information and access information regarding usage of the web sites by the panel members, and wherein
    the collected cookie information and access information is stored by each web site and transmitted from each web site to the central facility, and wherein
    the central facility stores a web page, and wherein
    the web page contains a URL of each web site, and wherein each panel member is arranged to access the web page and to respond to the URLs in the web page by transmitting to the central facility any cookies which the panel member has stored and which correspond to the received URLs, and wherein
    each web site.is arranged (i) to download cookies from the central facility; (ii) to compare the downloaded cookies to log entries regarding messages received from clients of the web site, and (iii) to transmit to the central facility that part of the log entries corresponding to the down loaded cookies.

7. The system of claim 6, wherein the comparison of the downloaded cookies to the log entries involves a binary search.

8. A system.comprising panel members, web sites, and a central facility interconnected in a network, wherein
    the central facility is arranged to collect cookie information and access information regarding usage of the web sites by the panel members, and wherein
    the collected cookie information and access information is stored by each web site and transmitted from each web site to the central facility, and wherein
    the central facility stores a web page, and wherein
    the web page contains a URL of each web site, and wherein each panel member is arranged to access the web page and to respond to the URLs in the web page by transmitting to the central facility any cookies which the panel member has stored and which correspond to the received URLs, and wherein
    each web site is arranged (i) to download cookies from the central facility, (ii) to compare the downloaded cookies to log entries regarding messages received from clients of the web site, and (iii) to transmit to the central facility only that part of the log entries corresponding to the down loaded cookies.

9. A system comprising panel members, web sites, and a central facility interconnected in a network, wherein the central facility is arranged to collect cookie information and access information regarding usage of the web sites by the panel members, and wherein the collected cookie information and access information is stored by each web site and transmitted from.each web site to the central facility, and wherein each panel member is arranged to transmit to the central facility any cookies which the panel member has stored and which correspond to the web sites, and wherein each web site is arranged (i) to download cookies from the central facility, (ii) to compare the downloaded cookies to log entries regarding messages received from clients of the web site, and (iii) to transmit to the central facility that part of the log entries corresponding to the down loaded cookies.

10. The system of claim 9 wherein the comparison of the downloaded cookies to the log entries involves a binary search.

11. A system comprising panel members, web sites, and a central facility interconnected in.a network, wherein the central facility is arranged to collect cookie information and access information regarding usage of the web sites by the panel members, and wherein the collected cookie information and access information is stored by each web site and transmitted from each web site to the central facility, and wherein each web site is arranged (i) to download cookies from the central facility, (ii) to compare the downloaded cookies to log entries regarding messages received from clients of the web site, and (iii) to transmit to the central facility that part of the log entries corresponding to the down loaded cookies.

12. The system of claim 11 wherein the comparison of the downloaded cookies to the log entries involves a binary search.

13. A system comprising panel members, web sites,.and a central facility interconnected in a network, wherein the central facility is arranged to collect cookie information and access information regarding usage of the web sites by the panel members, and wherein the collected cookie-information and access information is stored by each web site and transmitted from each web site to the central facility, and wherein each panel member is arranged to transmit panel member cookie/ID pairs to the web sites, and wherein each web site is arranged (i) to compare the panel member cookies of the cookie/ID pairs to client cookies received from clients of the web site and (ii) to transmit to the central facility only access information corresponding to the panel member cookies that matching the client cookies.

14. The system of claim 13 wherein the comparison of the panel member cookies to the client cookies involves a binary search.

15. A method of collecting access information relating to access by panel members to a plurality of web sites comprising the following steps:

a) identifying each panel member with a unique identifier and accessing, by each of the panel members, a web page stored at a central facility, wherein the-web page contains a URL for each of the web sites to be monitored;

b) in response to step a), transmitting, from-each panel member, either to each of the web sites corresponding to the URLs of the web page or to the central facility, any panel member cookies which the panel member has stored and which corresponds to the web sites;

c) accumulating at each of the web sites access information relating to the panel members, wherein said access information corresponds to each said unique identifier; and, d) transmitting, from each of the web sites to the central facility, the -accumulated access information, wherein step b) comprises the step of transmitting, from each panel member to each of the web sites corresponding to the URLs of the web-page, any panel.member cookies. V which the panel member has stored and which correspond to the URLs,a and wherein step c) comprises the -steps of comparing client cookies, which are received from clients of the web sites, to the panel member cookies, and transmitting to the central facility access information corresponding to the panel member cookies that match the client cookies.

16. The method of claim 15 wherein the comparing step comprises the step of performing a binary search.

17. A method of collecting access.information relating to access by panel members to a plurality of web sites comprising the following steps:

a) identifying each panel member with a unique identifier and accessing, by each of the panel members, a web page stored at a central facility, wherein the web page contains a URL for each of the web sites to be monitored;

b) in response to step a), transmitting, from each panel member, either to each of the web sites corresponding to the URLs of the web page or to the central facility, any panel member cookies which the panel member has stored and which corresponds to the web sites;

c) accumulating at each of the web sites access information relating to the panel members, wherein said access information corresponds to each said unique identifier; and, d) transmitting, from each of the web sites to the central facility, the accumulated access information, wherein step b) comprises the step of transmitting, from each panel member to each of the web sites corresponding to the URLs of the web page, any panel member cookies which the panel member has stored and which correspond to the URLs, and where in step c) comprises the steps of comparing client cookies, which are. Received from clients of the web sites,: to the panel member cookies, and transmitting to the central facility only access information corresponding to the panel member cookies that match the client cookies.

18. A method of collecting access information relating to access by panel members to a plurality of web sites comprising the following steps:

a) identifying each panel member with a unique identifier and accessing, by each of the panel members, a web page stored at a central facility, wherein the web page contains a URL for each of the web sites to be monitored;

b) in response to step a), transmitting, from each panel member, either to each of the web sites corresponding to the URLs of the web page or to the central facility, any panel member cookies which the panel member has stored and which corresponds to the web sites;

c) accumulating at each of the web sites access information relating to the panel members, wherein said access information corresponds to each said unique identifier; and, d) transmitting, from each of the web sites to the central facility, the accumulated access information, wherein step c) comprises the steps of downloading to the web sites the panel member cookies, comparing client cookies in log entries to the downloaded panel member cookies, and transmitting to the central facility access information from only the log entries corresponding to the down loaded panel member cookies.

19. The method of claim 18 wherein the comparing step comprises the step of performing a binary search.

20. A system comprising panel members, web sites, and a central facility interconnected in a network, wherein each of the web sites stores a central facility sub-server, said central facility sub-server being configured to allow the transmission of cookie information corresponding to each said web site to said central facility, wherein the central facility is arranged to initiate the transmission of panel member cookies from the panel members to the web sites, and wherein each of the central facility sub-servers is arranged to detect client cookies contained in incoming messages, to compare the panel member cookies to the client cookies, and to transmit to the central facility access information corresponding to the panel member cookies that match the client cookies.

21. A system comprising panel members, web sites, and a central facility interconnected in a network, wherein the central facility stores a central facility sub-server associated with the web sites, said central facility sub-server being configured to allow the transmission of cookie information corresponding to each said web site to said central facility, wherein the central facility is arranged to initiate the transmission of panel member cookies from the panel members to the central facility, and wherein each of the web sites is arranged to download panel member cookies from the central facility, to compare the panel member cookies to client cookies corresponding to log entries, and to transmit to the central facility access information from the log entries that correspond to the client cookies which match the panel member cookies.

22. A computer readable storage medium having program code stored thereon which, when executed at a web site, performs the following tasks:

a) receiving panel member cookies from panel members, wherein the web site, the panel members, and a central facility are interconnected by a network;

b) detecting client cookies from clients connected to the network, wherein the clients include the panel members;

c) comparing the panel member cookies to the client cookies; and, d) transmitting to the central facility access information corresponding to the client cookies that match the panel member cookies.

23. The computer readable storage medium of claim 22, wherein task d) comprises the task of transmitting to the central facility only access information corresponding to the client cookies that match the panel member cookies.

24. A computer readable storage medium having program code stored thereon which, when executed at a web site, performs the following tasks:

a) receiving panel member cookies from a central facility, wherein the web site, panel members, and the central facility are interconnected by a network;

b) detecting client cookies from clients connected to the network, wherein the clients include the panel members;

c) comparing the panel member cookies to the client cookies; and, d) transmitting to the central facility access information corresponding to the client cookies that match the panel member cookies.

25. The computer readable storage medium of claim 24 wherein task d) comprises the task of transmitting to the central facility only access information corresponding to the client cookies that match the panel member cookies.

* * * * *